United States Patent
Hanyu et al.

(10) Patent No.: US 8,439,798 B2
(45) Date of Patent: May 14, 2013

(54) HYDRAULIC APPARATUS FOR AUTOMATIC TRANSMISSION

(75) Inventors: Keiichi Hanyu, Wako (JP); Genso Igari, Wako (JP); Akihira Aoki, Wako (JP)

(73) Assignee: Honda Motors Co., Ltd, Tokyo (JP)

( * ) Notice: Subject to any disclaimer, the term of this patent is extended or adjusted under 35 U.S.C. 154(b) by 335 days.

(21) Appl. No.: 12/878,653

(22) Filed: Sep. 9, 2010

(65) Prior Publication Data

US 2011/0067968 A1 Mar. 24, 2011

(30) Foreign Application Priority Data

Sep. 16, 2009 (JP) .................................. 2009-214698

(51) Int. Cl.
*F16H 61/00* (2006.01)
*B60W 10/00* (2006.01)
*F16D 33/00* (2006.01)

(52) U.S. Cl.
USPC ............... 477/45; 477/79; 477/906; 192/3.29

(58) Field of Classification Search ............ 477/45, 477/50, 49, 168, 174, 180, 606; 475/60, 127, 475/133; 192/3.29, 3.54, 3.57
See application file for complete search history.

(56) References Cited

U.S. PATENT DOCUMENTS

| | | | | |
|---|---|---|---|---|
| 5,836,845 A | * | 11/1998 | Sakaguchi et al. | 475/131 |
| 5,865,704 A | * | 2/1999 | Takagi et al. | 477/62 |
| 5,906,555 A | * | 5/1999 | Sakaguchi et al. | 475/61 |
| 6,397,703 B1 | * | 6/2002 | Iijima | 74/732.1 |
| 6,612,958 B2 | * | 9/2003 | Imai et al. | 475/210 |
| 2003/0083169 A1 | | 5/2003 | Iwata et al. | |

FOREIGN PATENT DOCUMENTS

| | | |
|---|---|---|
| EP | 1895203 A2 | 3/2008 |
| JP | 56024256 A * | 3/1981 |
| JP | 2-5948 B2 | 2/1990 |
| JP | 03-149462 A | 6/1991 |
| JP | 03-265758 A | 11/1991 |
| JP | 05-106730 A | 4/1993 |
| JP | 06-341542 A | 12/1994 |
| JP | 2006-153104 A | 6/2006 |

OTHER PUBLICATIONS

European Search Report dated Mar. 1, 2011, issued in corresponding European Patent Application No. 10176006.4.

(Continued)

*Primary Examiner* — Roger Pang
(74) *Attorney, Agent, or Firm* — Westerman, Hattori, Daniels & Adrian, LLP (57) ABSTRACT

In a hydraulic apparatus for an automatic transmission having a torque converter with a lockup clutch and CVT, there are provided a first control valve for controlling hydraulic pressure supply to the lockup clutch oil chamber, a first electromagnetic solenoid valve for controlling operation of the first control valve, a second control valve for controlling hydraulic pressure supply to the CVT pulleys, a second electromagnetic solenoid valve for controlling operation of the second control valve, a switching valve interposed between the oil chamber and the first control valve. In the apparatus, when detecting that the first control valve or first electromagnetic solenoid valve is failed and the lockup clutch is locked in engaged condition, current supply to the second electromagnetic solenoid valve is stopped so that it operates the switching valve to disengage the lockup clutch, thereby enabling to forcibly release the engagement without manipulation by the operator.

9 Claims, 5 Drawing Sheets

OTHER PUBLICATIONS

Japanese Office Action date Aug. 2, 2011, issued in corresponding Japanese Patent Application No. 2009-214698.
Japanese Office Action dated Mar. 7, 2012, issued in corresponding Japanese Patent Application No. 2009-214698.
Japanese Notice of Allowance dated Mar. 27, 2013, issued in corresponding Japanese Patent Application No. 2012-110423, w/ English translation (4 pp).

* cited by examiner

HYDRAULIC APPARATUS FOR AUTOMATIC TRANSMISSION

BACKGROUND OF THE INVENTION

1. Field of the Invention

This invention relates to a hydraulic apparatus for an automatic transmission, particularly to a hydraulic apparatus for an automatic transmission that, when a lockup clutch of a torque converter is locked (stuck) in engaged condition, can release the engagement.

2. Description of the Related Art

In an automatic transmission, when a lockup clutch of a torque converter is locked in the engaged condition, it causes the engine stall. Although the engine stall can be avoided if a forward/reverse clutch is disengaged, it makes the engine restart impossible.

The above problem is remarkable when the torque converter is equipped with only one control valve that controls the engagement/disengagement of the lockup clutch and the capacity of engagement (when engaged) by using hydraulic pressure of oil to be supplied/discharged to/from an oil chamber of the lockup clutch and with only one electromagnetic solenoid valve that controls the operation of the control valve.

To cope with it, Japanese Patent Publication No. Hei 2(1990)-5948 proposes a technique to move a manual valve to a predetermined position for forcibly releasing the engagement of a lockup clutch when it is locked in the engaged position.

SUMMARY OF THE INVENTION

In the reference, the lockup clutch locked in the engaged condition can be forcibly released. However, this configuration requires the operator to move the manual valve to a predetermined position by manipulating a shift lever. It is troublesome and disadvantageous for the operator.

An object of this invention is therefore to overcome the foregoing drawback by providing a hydraulic apparatus for an automatic transmission that, when a lockup clutch of a torque converter is locked (stuck) in the engaged condition, can forcibly release the engagement without manipulation by the operator.

In order to achieve the object, this invention provides a hydraulic apparatus for an automatic transmission mounted on a vehicle and equipped with a torque converter having a lockup clutch and a transmission mechanism that inputs an output of a prime mover through the torque converter and transmits power to a wheel of the vehicle, comprising: a power transmission regulating member that is equipped with a cylinder chamber and regulates the power transmitted by the transmission mechanism in response to hydraulic pressure of operating oil supplied to the cylinder chamber from a hydraulic pressure source; a first control valve interposed between an oil chamber of the lockup clutch and the hydraulic pressure source to supply/discharge the hydraulic pressure to/from the oil chamber so as to control engagement/disengagement of the lockup clutch and capacity of engagement; a first electromagnetic solenoid valve that is adapted to control operation of the first control valve; a second control valve interposed between the hydraulic pressure source and the cylinder chamber of the power transmission regulating member to control operation of the power transmission regulating member by supplying/discharging the hydraulic pressure to/from the cylinder chamber; a second electromagnetic solenoid valve that controls operation of the second control valve; a switching valve interposed between the oil chamber of the lockup clutch and the first control valve, and a controller that stops supply of current to the second electromagnetic solenoid valve so that the second electromagnetic solenoid valve operates the switching valve to disengage the lockup clutch, when detecting that at least one of the first control valve and the first electromagnetic solenoid valve is failed and that the lockup clutch is locked in engaged condition.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A preferred embodiment of a hydraulic apparatus for an automatic transmission according to the invention will now be explained with reference to the attached drawings.

Figure 1:
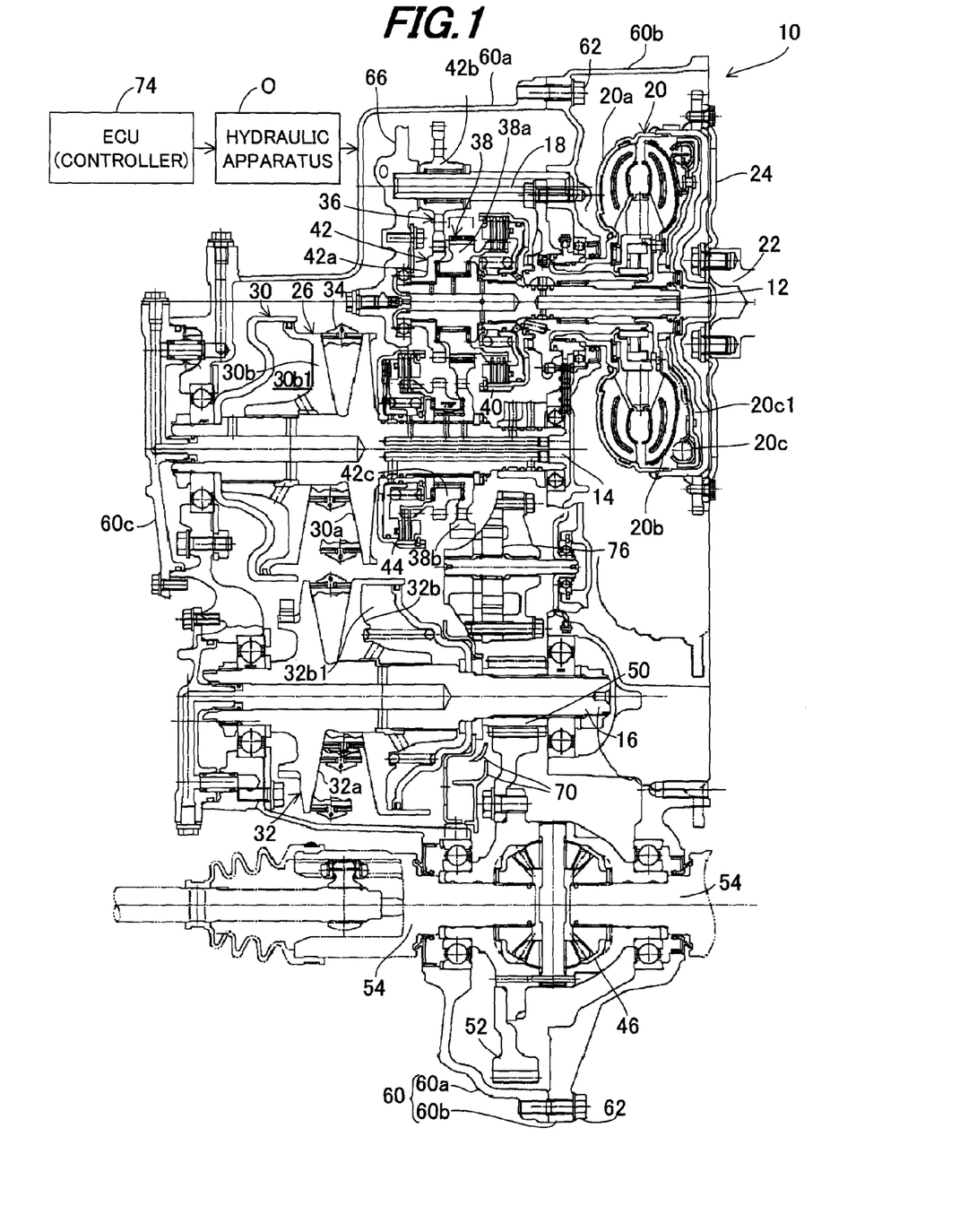
FIG. 1 is a sectional view of an automatic transmission to which a hydraulic apparatus for an automatic transmission according to a first embodiment of this invention is applied.

FIG. 1 is a sectional view of an automatic transmission to which a hydraulic apparatus for an automatic transmission according to a first embodiment of this invention is applied.

In FIG. 1, a symbol 10 indicates an automatic transmission, specifically a continuous variable transmission (transmission mechanism; hereinafter called the "CVT"). The CVT 10 is a belt-type CVT adapted to be mounted on a vehicle (not shown) and transmits an output of a prime mover, i.e., an internal combustion engine (not shown) to right and left driven wheels (not shown), while changing the engine output in speed.

As illustrated, the CVT 10 comprises an input shaft 12, DR (drive) pulley shaft 14, DN (driven) pulley shaft 16 and idle shaft 18 which are positioned in parallel. The engine output is inputted from the input shaft 12 through a torque converter 20.

The torque converter 20 includes a pump impeller 20$a$ fastened to a drive plate 24 connected to a crankshaft 22 of the engine, a turbine runner 20$b$ fastened to the input shaft 12, and a lockup clutch 20$c$.

The lockup clutch 20$c$ is equipped with an oil chamber 20$c$1, more exactly a back-pressure oil chamber 20$c$11, and transmits the engine output to the input shaft 12 with an engagement force corresponding to hydraulic pressure (pressure of operating oil) supplied to the back-pressure oil chamber 20$c$11.

A metal V-belt mechanism (transmission mechanism) 26 is provided between the DR pulley shaft 14 and DN pulley shaft 16.

The metal V-belt mechanism 26 includes a DR (drive) pulley (power transmission regulating member) 30 installed at the DR pulley shaft 14, a DN (driven) pulley (power transmission regulating member) 32 installed at the DN pulley shaft 16, and a metal V-belt 34 adapted to be wound (run) around the pulleys 30, 32.

The DR pulley 30 has a fixed DR pulley-half 30a that is connected to the DR pulley shaft 14 to be rotatable relative to the shaft 14, but imovable in the axial direction of the shaft 14, and a movable DR pulley-half 30b that is connected to the DR pulley shaft 14 to be not rotatable relative to the shaft 14, but movable in the axial direction of the shaft 14 relative to the fixed DR pulley-half 30a.

The DN pulley 32 has a fixed DN pulley-half 32a that is connected to the DN pulley shaft 16 to be not rotatable relative to the shaft 16 and imovable in the axial direction of the shaft 16, and a movable DN pulley-half 32b that is connected to the DN pulley shaft 16 to be not rotatable relative to the shaft 16, but movable in the axial direction of the shaft 16 relative to the fixed DN pulley-half 32a.

The movable DR and DN pulley-halves 30b, 32b are installed with cylinder chambers 30b1, 32b1, and are movable closer to and away from the fixed DR and DN pulley-halves 30a, 32a in response to the oil pressure (pulley clamping pressure) supplied to the cylinder chambers 30b1, 32b1, respectively.

The DR pulley 30 and DN pulley 32 are wound with the V-belt 34. The V-belt 34 comprises a number of V-shaped elements and two rings attached on the both lateral sides (none of which shown). The side surfaces of the V-shaped elements contact pulley surfaces of the DR pulley 30 and DN pulley 32 to transmit power of the engine from the DR pulley 30 to the DN pulley 32, as being strongly clamped (pressed) from the both lateral sides.

The input shaft 12 is installed with a forward/reverse switch mechanism 36 for switching the traveling direction of the vehicle. The forward/reverse switch mechanism 36 includes a forward (FWD) gear 38, forward (FWD) clutch (power transmission regulating member) 40, reverse (RVS) gear 42 and reverse (RVS) clutch (power transmission regulating member) 44.

The forward gear 38 comprises a forward DR gear 38a that is connected to the input shaft 12 rotatably, and a forward DN gear 38b that is adapted to be meshed with the forward DR gear 38a and is connected to the DR pulley shaft 14 not rotatably.

The forward DR gear 38a is connected to the forward clutch 40 fastened to the input shaft 12 via a guide. When the forward clutch 40 is brought into engagement upon the supply of the operating oil, the forward DR gear 38a is fixed to the input shaft 12.

As a result, the engine output inputted from the input shaft 12 through the torque converter 20 is transmitted via the forward DR gear 38a and forward DN gear 38b to the DR pulley shaft 14, thereby rotating the shaft 14 in the direction to make the vehicle travel forward.

The reverse gear 42 comprises a reverse DR gear 42a that is connected to the input shaft 12 not rotatably, a reverse idle gear 42b that is adapted to be meshed with the reverse DR gear 42a and is connected to the idle shaft 18 rotatably, and a reverse DN gear 42c that is adapted to be meshed with the reverse idle gear 42b and is connected to the DR pulley shaft 14 rotatably.

The reverse DN gear 42c is connected to the reverse clutch 44 fastened to the DR pulley shaft 14 via a guide. When the reverse clutch 44 is brought into engagement upon the supply of the operating oil, the reverse DN gear 42c is fixed to the DR pulley shaft 14.

As a result, when the forward clutch 40 is not in engagement, the engine output inputted from the input shaft 12 through the torque converter 20 is transmitted via the reverse DR gear 42a to the reverse idle gear 42b to reverse the rotation, and is then transmitted via the reverse DN gear 42c to the DR pulley shaft 14, thereby rotating the shaft 14 in the direction to make the vehicle travel reverse (backward) opposite to the forward traveling direction.

The DN pulley shaft 16 is connected with a differential mechanism 46. Specifically, the DN pulley shaft 16 is disposed with a final DR gear 50 that meshes with a final DN gear 52 fastened to a case of the differential mechanism 46.

The differential mechanism 46 is fastened with right and left axles 54 whose one ends are attached with driven wheels. The final DN gear 52 rotates the case of the differential mechanism 46, as a whole, about the axles 54 with the rotation of the DN pulley shaft 16.

When the engine rotation is inputted to the input shaft 12 under the condition where the pulley clamping pressure (acting in the lateral direction) capable of avoiding slippage of the belt 34 is applied by controlling the oil pressure to be supplied to the cylinder chambers 30b1, 30b2 of the pulleys 30, 32, the inputted rotation is transmitted from the input shaft 12 to the DR pulley shaft 14, DR pulley 30, V-belt 34, DN pulley 32 and then DN pulley shaft 16.

The metal V-belt mechanism 26 is configured to change the pulley widths by increasing/decreasing the pulley clamping pressure for both of the DR and DN pulleys 30, 32 to vary winding radiuses of the V-belt 34 for the pulleys 30, 32, so that a gear ratio can be continuously or steplessly controlled as desired in accordance with a radius ratio (pulley ratio).

As illustrated, the CVT 10 is housed in a transmission case 60. The transmission case 60 comprises an M (mission) case 60a for accommodating a main body of the transmission such as the CVT 10, and a TC (torque converter) case 60b for accommodating the torque converter 20.

The M case 60a and TC case 60b of the transmission case 60 are fastened to each other by a plurality of bolts 62 with their openings in face-to-face contact. The M case 60a is closed by a cap 60c on the opposite side from the TC case 60b.

An input shaft holder (middle wall) 66 is disposed to stand in the M case 60a of the transmission case 60 so that the input shaft 12 and idle shaft 18 are supported thereby. The inside of the input shaft holder 66 is installed with an oil passage (not shown).

A baffle plate 70 is installed near the DN pulley shaft 16 and the final DN gear 52 of the differential mechanism 46. The baffle plate 70 regulates the flow of operating oil drawn up by the final DN gear 52 and supplies the oil to bearings, etc., of the differential mechanism 46, etc., for lubricating them.

Figure 2:
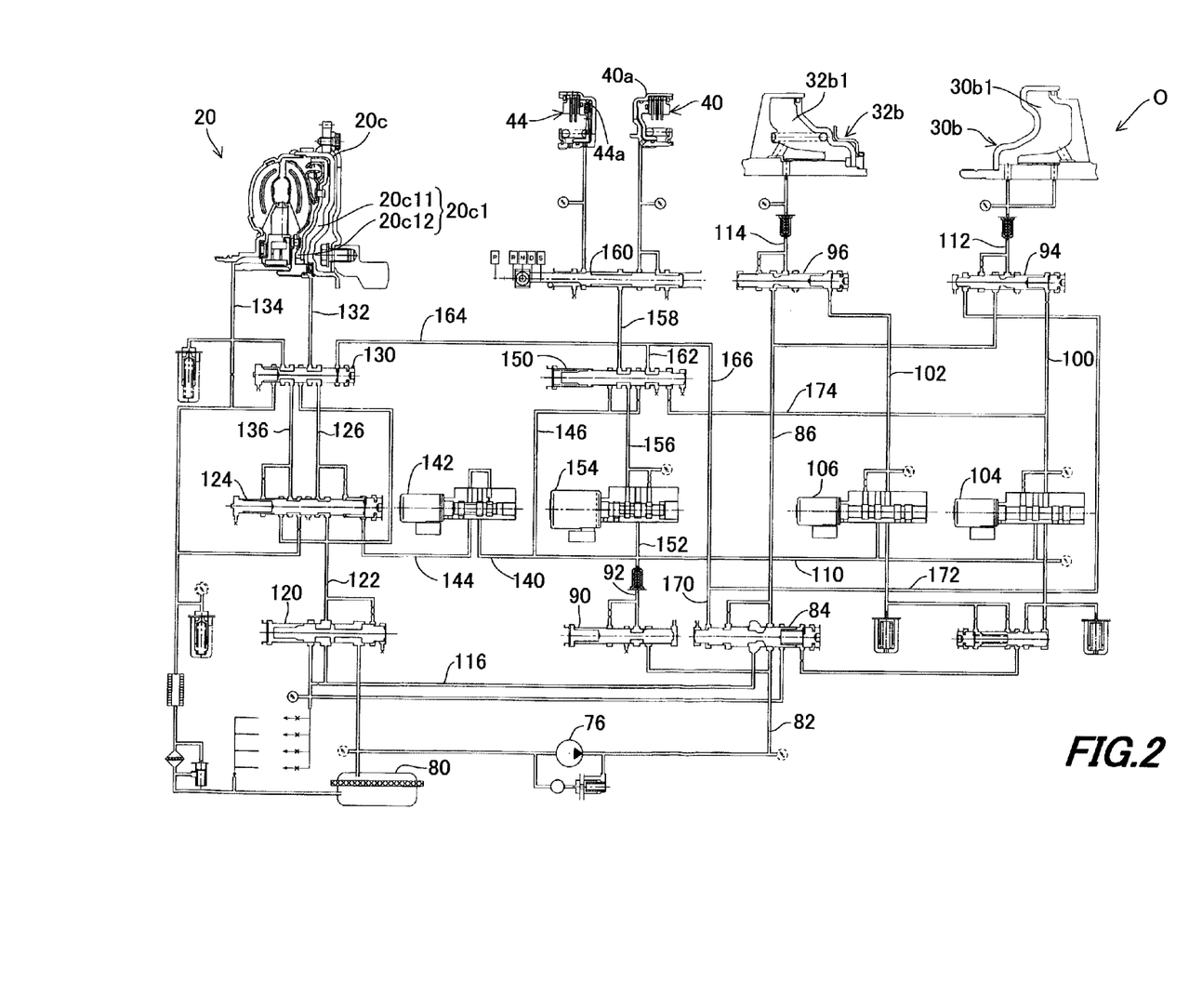
FIG. 2 is a hydraulic circuit diagram showing details of the hydraulic apparatus shown in FIG. 1.

The engagement (ON)/disengagement or release (OFF) of the aforementioned lockup clutch 20c of the torque converter 20, the capacity of engagement when engaged, the pulley width of the DR pulley 30, etc., the engagement/disengagement of the forward clutch 40 and reverse clutch 44, and the like, are controlled by regulating the hydraulic oil pressure to be supplied to the oil chamber 20c1 and cylinder chambers 30b1, 32b1, 40a, 44a (shown in FIG. 2).

Specifically, as shown in FIG. 1, the hydraulic apparatus (now assigned with symbol O) for the automatic transmission according to this embodiment is equipped with an electronic control unit (ECU; controller) 74 that comprises a microcomputer. Based on parameters indicating the operating condition such as the engine speed, throttle opening, turbine rotational speed, pulley rotational speed and vehicle speed, the ECU 74 energizes/deenergizes (supplies or does not supply current to) an electromagnetic solenoid valve (explained later) of the hydraulic apparatus O, thereby controlling the supply/discharge of the hydraulic pressure.

FIG. 2 is a circuit diagram showing details of the hydraulic apparatus O.

The hydraulic apparatus O will be explained with reference to FIG. 2.

In the apparatus O, a hydraulic pump 76 is driven by the engine through a chain (as shown in FIG. 1) to pump up the operating oil in a reservoir 80 to be forwarded to a PH regulator valve 84 through an oil passage 82.

The PH regulator valve 84 regulates discharge pressure of the hydraulic pump 76 in accordance with the driving condition of the vehicle and generates and supplies PH pressure (basic pressure; line pressure) to the oil passage 86. The oil passage 86 is connected to the cylinder chambers 30$b$1, 32$b$1 of the movable DR pulley-half 30$b$ and movable DN pulley-half 32$b$.

The oil passage 82 which starts from the hydraulic pump 76 is branched in midstream and connected to a CR valve 90. The CR valve 90 decreases the discharged pressure of the hydraulic pump 76 supplied through the oil passage 82 to generate CR pressure to be outputted to an oil passage 92.

Returning to the explanation on the pulleys 30, 32, the oil passage 86 is interposed with a DR regulator valve 94 and a DN regulator valve 96. A spool is housed in each of the DR and DN regulator valves 94, 96, and is urged by a spring at its one end (right end in the drawing) toward the other end (left end in the drawing).

The DR and DN regulator valves 94, 96 are connected on the side of the one ends of the spools to a DRC linear solenoid valve (second electromagnetic solenoid valve) 104 and DNC linear solenoid valve (electromagnetic solenoid valve) 106 through oil passages 100, 102, respectively.

The DRC and DNC linear solenoid valves 104, 106 are connected to an oil passage 110 connected to the CR valve 90. Each of the valves 104, 106 is equipped with a spool that is moved (displaced) in response to an amount of supply current to regulate the CR pressure and generates DRC pressure or DNC pressure to be outputted to the DR or DN regulator valve 94, 96.

Figure 3:
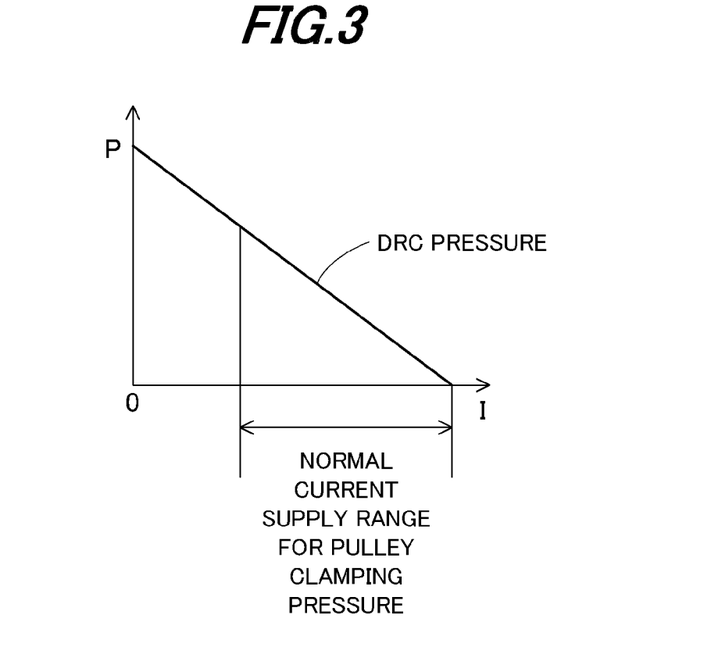
FIG. 3 is an explanatory view showing a normal current supply range (for pulley clamping pressure) of a second electromagnetic solenoid valve shown in FIG. 2.

FIG. 3 is an explanatory view showing a normal current supply range of the DRC linear solenoid valve 104 relative to pressure P (output hydraulic pressure indicative of pulley clamping pressure). As illustrated, the DRC pressure (output hydraulic pressure) P is set to increase with decreasing current amount I, while a range of current that exceeds a slight current range is used for normal pulley clamping pressure control.

Specifically, when the supply of current is stopped, the output pressure of the DRC linear solenoid valve 104 reaches its maximum value. The DNC linear solenoid valve 106 has the same characteristics as shown in FIG. 3, although not shown in the drawing.

The explanation on FIG. 2 is resumed. The outputted DRC pressure or DNC pressure is supplied to the one end side of the spool of the DR or DN regulator valve 94, 96 to move the spool in the left or right (in the drawing). Consequently, the hydraulic pressure obtained by regulating the PH pressure is supplied to the cylinder chamber 30$b$1 of the movable DR pulley-half 30$b$ and the cylinder chamber 32$b$1 of the movable DN pulley-half 32$b$ through oil passages 112, 114, respectively.

Thus the amounts of current to be supplied to the DRC and DNC linear solenoid valves 104, 106 are controlled to increase/decrease the clamping (lateral) pressure of the DR pulley 30 and DN pulley 32, thereby controlling the gear ratio.

Explaining the lockup clutch 20$c$ of the torque converter 20, a second output port (TC operating oil pressure output port) of the PH regulator valve 84 is connected to a TC regulator valve 120 through an oil passage 116 and then to an LC control valve 124 through an oil passage 122.

The LC control valve 124 is connected to an LC inhibitor valve 130 through an oil passage 126 and then to the oil chamber 20$c$1 (precisely, the back-pressure oil chamber 20$c$11) of the lockup clutch 20$c$ through an oil passage 132. The oil chamber 20$c$1 of the lockup clutch 20$c$ is also equipped with an internal-pressure oil chamber 20$c$12, and the back-pressure oil chamber 20$c$11 is communicated with the internal-pressure oil chamber 20$c$12.

The internal-pressure oil chamber 20$c$12 of the lockup clutch 20$c$ is connected to an oil passage 134. The oil passage 134 is connected to the reservoir 80, while being connected to the LC inhibitor valve 130 and then to the LC control valve 124 through an oil passage 136.

The output port of the CR valve 90 is connected through an oil passage 140 to an LCC linear solenoid valve (electromagnetic solenoid valve) 142 and LCC pressure generated thereby is supplied to an end of a spool of the LC control valve 124 through an oil passage 144.

Explaining the forward clutch 40 and the like, the output port of the CR valve 90 is directly connected to a B/U (backup) valve (switching valve) 150 through an oil passage 146, while also being connected through an oil passage 152 to a CPC linear solenoid valve (electromagnetic solenoid valve) 154 and CPC pressure generated thereby is supplied to the B/U valve 150 through an oil passage 156.

The output port of the B/U valve 150 is connected to a manual valve 160 through an oil passage 158. A spool of the manual valve 160 is moved upon manipulation of a shift lever by the operator so that, when the shift lever is positioned at the forward driving range, the oil passage 158 is connected to the cylinder chamber 40$a$ of the forward clutch 40, while, when the shift lever is positioned at the reverse range, it is connected to the cylinder chamber 44$a$ of the reverse clutch 44.

A B/U port 162 of the B/U valve 150 is connected to a B/U port of the LC inhibitor valve 130 through an oil passage 164, while being connected via oil passages 166, 170 to a B/U port of the PH regulator valve 84 and via oil passages 166, 172 to a B/U port of the DR regulator valve 94.

The DRC pressure outputted from the DRC linear solenoid valve 104 to the DR regulator valve 94 is applied to an end of a spool of the B/U valve 150 through a branch oil passage 174 to urge the spool toward the right (in the drawing).

Next, the operation of the hydraulic apparatus O will be explained with reference to FIG. 4 and other figures.

Figure 4:
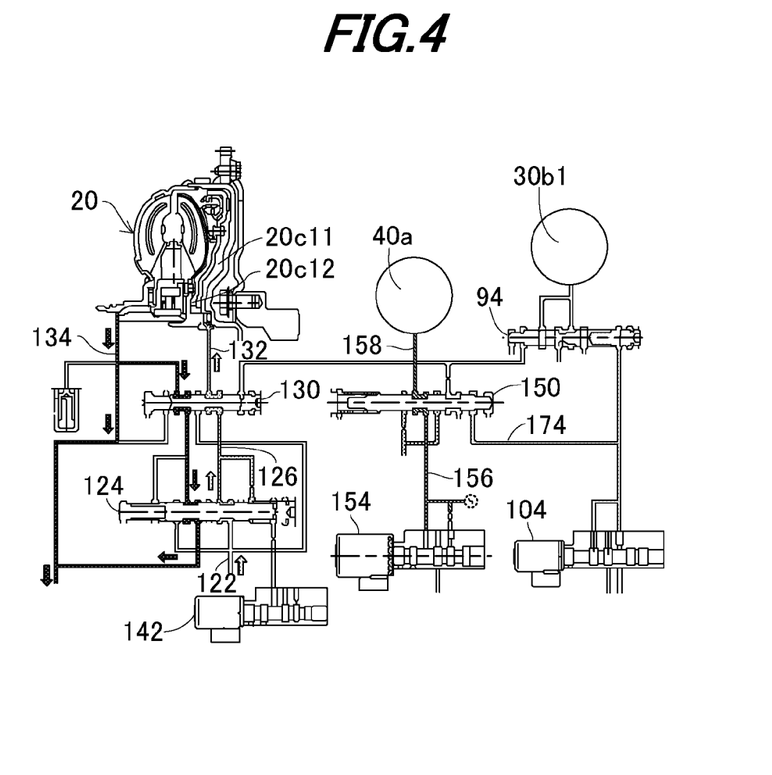
FIG. 4 is a partial hydraulic circuit diagram of FIG. 2, with primary focus on normal disengagement (release) of a lockup clutch shown in FIG. 1.

FIG. 4 is a circuit diagram showing normal disengagement (OFF) operation or the like of the lockup clutch 20$c$ at the drive range, etc.

In this case, the ECU 74 blocks supply of current to the LCC linear solenoid valve 142. Since no hydraulic pressure is applied, the spool of the LC control valve 124 is positioned as illustrated.

As a result, the TC operating oil pressure (hydraulic pressure) supplied from the TC regulator valve 120 through the oil passage 122 is forwarded to the LC control valve 124, passed through the shown output port thereof, and further forwarded to the LC inhibitor valve 130 through the oil passage 126.

The TC operating oil pressure is passed through the shown output port of the LC inhibitor valve 130 and supplied to the back-pressure oil chamber 20c11 of the lockup clutch 20c through the oil passage 132.

Subsequently the TC operating oil pressure returns to the oil passage 134 after passing through the internal-pressure oil chamber 20c12 communicated with the back-pressure oil chamber 20c11 and then returns to the reservoir 80. Owing to this TC operating oil pressure supplied to the back-pressure oil chamber 20c11, the lockup clutch 20c is operated to be released from the engaged (ON) position.

The ECU 74 supplies current to the CPC linear solenoid valve 154 to supply the CPC pressure (obtained by reducing the CR pressure) to the B/U valve 150. Although the B/U valve 150 is applied with the DRC pressure from the DRC linear solenoid valve 104, since it is the normal pressure, the spool of the B/U valve 150 is positioned as shown.

Therefore, the CPC pressure is passed through the shown output port of the B/U valve 150 and through a predetermined port of the manual valve 160 (omitted in FIG. 4), and then supplied to the cylinder chamber 40a of the forward clutch 40. As a result, the forward gear 38 is fixed to the input shaft 12 so that the DR pulley shaft 14 is driven in the direction to make the vehicle travel forward.

It should be noted that the ECU 74 supplies current to the DRC linear solenoid valve 104 (and DNC linear solenoid valve 106) in accordance with the characteristics shown in FIG. 3 to regulate the hydraulic pressure to be supplied to the pulley, thereby controlling the gear ratio.

Figure 5:
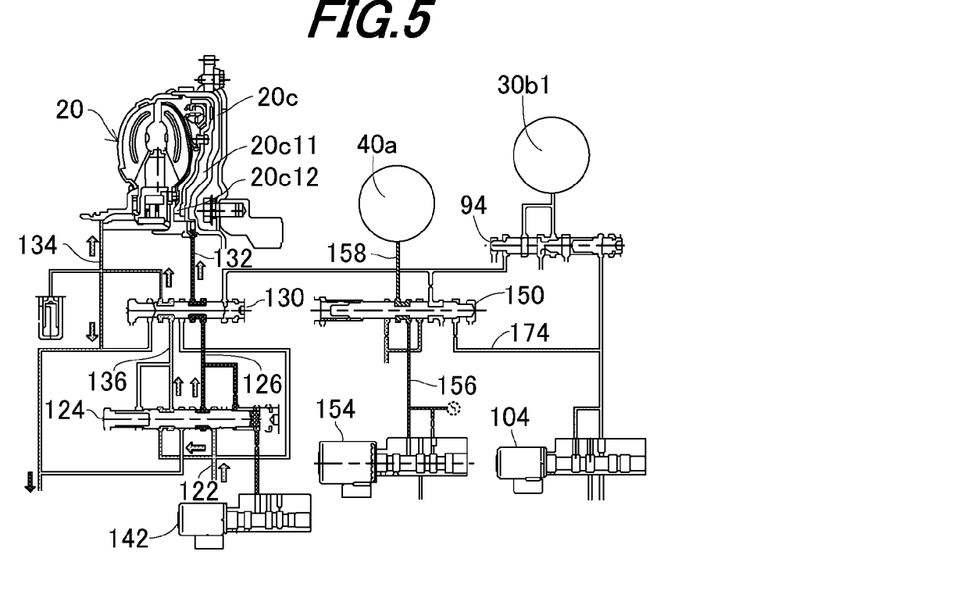
FIG. 5 is a partial hydraulic circuit diagram of FIG. 2, with primary focus on normal engagement of the lockup clutch shown in FIG. 1.

FIG. 5 is a circuit diagram showing normal engagement (ON) operation or the like of the lockup clutch 20c at the drive range, etc.

In this case, the ECU 74 supplies current to the LCC linear solenoid valve 142 to apply the LCC pressure to the LC control valve 124 so as to move the spool thereof toward the left (in the drawing). As a result, the TC operating oil pressure supplied from the TC regulator valve 120 through the oil passage 122 is forwarded to the LC control valve 124 through the shown input port located on the left side, passed through the shown output port located on the left side, and then supplied to the LC inhibitor valve 130 through the oil passage 136.

The TC operating oil pressure is passed through the shown output port of the LC inhibitor valve 130 and forwarded to the internal-pressure oil chamber 20c12 of the lockup clutch 20c through the oil passage 134. On the other hand, the hydraulic pressure (reduced by the LC control valve 124) is supplied to the back-pressure oil chamber 20c11 of the lockup clutch 20c via the oil passage 132 of the LC inhibitor valve 130.

Specifically, owing to pressure difference between the pressure (hydraulic pressure) of operating oil supplied to the internal-pressure oil chamber 20c12 and the pressure (hydraulic pressure) of operating oil supplied to the back-pressure oil chamber 20c11, the lockup clutch 20c is operated to be engaged (made ON). The capacity of engagement of the lockup clutch 20c is controlled by regulating the hydraulic pressure supplied to the back-pressure oil chamber 20c11 from the disengaged (OFF) condition. In FIG. 5, the supply current control of the CPC linear solenoid valve 154, DRC linear solenoid valve 104, etc., is the same as in FIG. 4.

Figure 6:
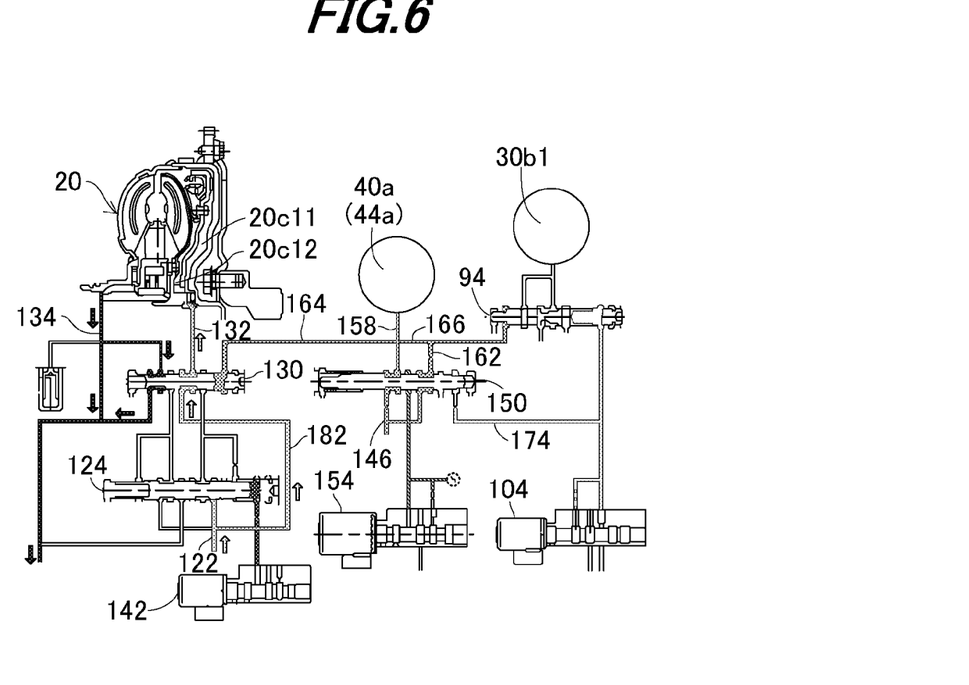
FIG. 6 is a partial hydraulic circuit diagram of FIG. 2, with primary focus on forcible disengagement (release) of the lockup clutch shown in FIG. 1 which is locked (stuck) in engaged condition.

Next, the explanation will be made on forcible disengagement (release; OFF) operation of the lockup clutch 20c in the case where the LC control valve 124 or LCC linear solenoid valve 142 is failed so that the lockup clutch 20c is locked (stuck) in the engaged (ON) condition, i.e., locked in the condition shown in FIG. 5. FIG. 6 is a circuit diagram showing the operation.

When at least one of the LC control valve 124 and LCC linear solenoid valve 142 is failed and it is detected by the ECU 74 that the lockup clutch 20c is locked in the engaged condition, the supply of current to the DRC linear solenoid valve (second electromagnetic solenoid valve) 104 is stopped.

As a result, as shown in FIG. 3, the DRC pressure outputted from the DRC linear solenoid valve 104 becomes its maximum value. The output is sent to the B/U valve 150 through the oil passage 174 to move the spool leftward (in the drawing).

Consequently, as shown in FIG. 6, the B/U pressure is applied via the oil passage 164 to the LC inhibitor valve 130 to move the spool leftward (in the drawing), whereby the TC operating oil pressure is introduced from the back-pressure oil chamber 20c11 and discharged from the internal-pressure oil chamber 20c12, thereby forcibly disengaging or releasing the engaged condition of the lockup clutch 20c. Further, the B/U pressure is passed through the manual valve 160 (omitted in FIG. 6) and supplied to the cylinder chamber 40a of the forward clutch 40 or the cylinder chamber 44a of the reverse clutch 44 so as to maintain the engaged condition of the either clutch, thereby enabling to continue the vehicle driving.

It should be noted that, instead of stopping the supply of current to the DRC linear solenoid valve 104, a slight current below the normal current supply range (to be used for normal pulley clamping pressure range) shown in FIG. 3 may be supplied. In that sense, "stopping the supply of current" in this embodiment includes a case that an amount of supply current is zero and a case that a slight current below the normal current supply range is supplied.

Even when the supply of current to the DRC and DNC linear solenoid valves 104, 106 is stopped, the line pressure from the PH regulator valve 84 is continuously supplied to the cylinder chambers 30b1, 32b1 of the DR and DN pulleys 30, 32 through the DR and DN regulator valves 94, 96 and also the B/U pressure is applied, so that the vehicle driving can be continued safely.

Therefore, in the case where one or both of the LC control valve 124 and LCC linear solenoid valve 142 experience(s) an ON failure (in which the lockup clutch 20c is locked or stuck in the engaged condition), the DRC linear solenoid valve 104 can operate the B/U valve (switching valve) 150 to release the lockup clutch 20c. With this, it becomes possible to prevent the engine stall and restart the vehicle (after being stopped) without trouble.

Figure 7:
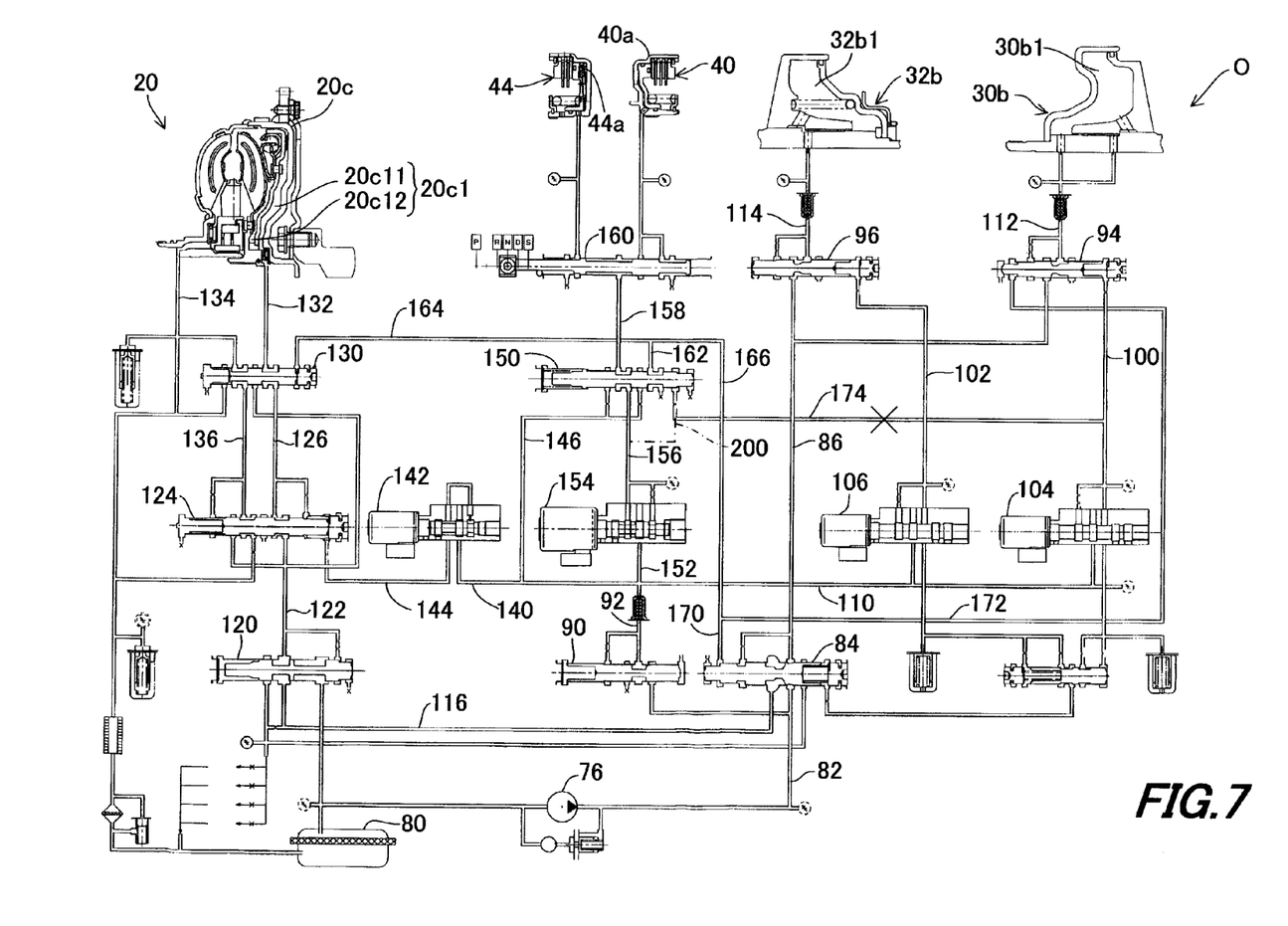
FIG. 7 is a hydraulic circuit diagram showing details of a hydraulic apparatus of an automatic transmission according to a second embodiment of this invention.

FIG. 7 is a circuit diagram showing details of a hydraulic apparatus of an automatic transmission according to a second embodiment of this invention.

The explanation of the second embodiment will focus on the points of difference from the first embodiment.

In the second embodiment, the CR valve 90 is applied as the first control (pressure regulating) valve and the CPC linear solenoid valve 154 as the second electromagnetic solenoid valve. Further, the characteristics of the output pressure of the CPC linear solenoid valve 154 is set the same as that of the DRC linear solenoid valve 104 shown in FIG. 3, while the oil passage 174 is removed as indicated with "X" in FIG. 7 and an oil passage 200 is provided instead as indicated by an imaginary line so that the output of the CPC linear solenoid valve 154 is connected to the B/U valve 150.

Also in the second embodiment, in the case where at least one of the LC control valve 124 and LCC linear solenoid valve 142 experiences the ON failure, the CPC linear solenoid valve (second control valve) 154 can operate the B/U valve (switching valve) 150 to release the lockup clutch 20c. With this, it becomes possible to prevent the engine stall and restart the vehicle (after being stopped) without trouble. The remaining configuration as well as the effects is the same as that in the first embodiment.

As stated above, the first and second embodiments are configured to have a hydraulic apparatus for an automatic transmission (10) mounted on a vehicle and equipped with a torque converter (20) having a lockup clutch (20c) and a transmission mechanism (26) that inputs an output of a prime mover through the torque converter and transmits power to a wheel of the vehicle, comprising: a power transmission regulating member (DR (drive) pulley 30, DN (driven) pulley 32, forward clutch 40, reverse clutch 44) that is equipped with a cylinder chamber (30b1, 32b1, 40a, 44a) and regulates the power transmitted by the transmission mechanism in response to hydraulic pressure of operating oil supplied to the cylinder chamber from a hydraulic pressure source (reservoir 80); a first control valve (LC control valve 124) interposed between an oil chamber (20c1) of the lockup clutch (20c) and the hydraulic pressure source to supply/discharge the hydraulic pressure to/from the oil chamber so as to control engagement/disengagement of the lockup clutch and capacity of engagement; a first electromagnetic solenoid valve (LCC linear solenoid valve 142) that is adapted to control operation of the first control valve (LC control valve 124); a second control valve (DR regulator valve 94 in the first embodiment, CR valve 90 in the second embodiment) interposed between the hydraulic pressure source and the cylinder chamber (30b1, 32b1) of the power transmission regulating member (DR pulley 30, DN pulley 32) to control operation of the power transmission regulating member by supplying/discharging the hydraulic pressure to/from the cylinder chamber; a second electromagnetic solenoid valve (DRC linear solenoid valve 104 in the first embodiment, CPC linear solenoid valve 154 in the second embodiment) that controls operation of the second control valve (DR regulator valve 94, CR valve 90); a switching valve (B/U valve 150) interposed between the oil chamber of the lockup clutch (20c) and the first control valve (LC control valve 124), and a controller (ECU 74) that stops supply of current to the second electromagnetic solenoid valve (DRC linear solenoid valve 104, CPC linear solenoid valve 154) so that the second electromagnetic solenoid valve operates the switching valve (B/U valve 150) to disengage the lockup clutch (20c), when detecting that at least one of the first control valve (LC control valve 124) and the first electromagnetic solenoid valve (LCC linear solenoid valve 142) is failed and that the lockup clutch is locked in engaged condition.

With this, even when the lockup clutch 20c of the torque converter 20 is locked or stuck in the engaged condition, it becomes possible to release (disengage) the engagement without the need of manipulation by the operator or the like.

Further, since one control valve (LC control valve) 124 and one first electromagnetic solenoid valve (LCC linear solenoid valve) 142 for controlling the operation of the control valve 124 are used to supply/discharge the hydraulic pressure to/from the oil chamber 20c1 of the lockup clutch 20c of the torque converter 20 so as to control the engagement/disengagement of the lockup clutch 20 and the capacity of engagement, the structure can be simple.

In the apparatus, the second electromagnetic solenoid valve (DRC linear solenoid valve 104, CPC linear solenoid valve 154) is configured to increase hydraulic pressure output to operate the switching valve (B/U valve 150) when the supply of current thereto is stopped. With this, in addition to the above effects, it becomes possible to easily and reliably release the engagement of the lockup clutch 20c.

In the apparatus, the second electromagnetic solenoid valve (DRC linear solenoid valve 104, CPC linear solenoid valve 154) is configured to increase the hydraulic pressure output as the supply of current decreases, such that the hydraulic pressure output reaches its maximum value when the supply of current is stopped. With this, in addition to the above effects, it becomes possible to easily release the engagement of the lockup clutch 20c.

In the apparatus, the transmission mechanism (26) comprises a CVT that includes a drive pulley (30), a driven pulley (32) and a metal belt (34) wound around the pulleys and transmits the output of the prime mover by changing an effective diameter of the drive pulley (30) and the driven pulley (32), and the power transmission regulating member comprises the drive pulley (30) and driven pulley (32) of the CVT. In the apparatus, the second electromagnetic solenoid valve comprises a linear solenoid valve (DRC linear solenoid valve 104) that control operation of the second control valve (DR regulator valve 94) which regulates the hydraulic pressure to be supplied to at least one of the cylinder chamber (30b1, 32b1) of the drive pulley (30) and driven pulley (32). With this, in the CVT 10, it becomes possible to release the engagement without the need of manipulation by the operator or the like.

In the apparatus, the power transmission regulating member comprises a forward/reverse switch mechanism (36) having a forward clutch (40) and a reverse clutch (44) used for switching a traveling direction of the vehicle, and the second electromagnetic solenoid valve comprises a linear solenoid valve (CPC linear solenoid valve 154) that control operation of the second control valve (CR valve 90) which regulates the hydraulic pressure to be supplied to at least one of the cylinder chamber (40a, 44a) of the forward clutch (40) and reverse clutch (44). With this, in addition to the above effects, the existing mechanism can be utilized, thereby enabling to achieve the simple structure.

In the apparatus, the prime mover comprises an internal combustion engine.

It should be noted that, instead of the CVT, it is possible to use an automatic transmission that allows few different distinct gear ratios to be selected. Further, the lockup clutch can be equipped with a cylinder-shaped piston oil chamber and in that case, the piston oil chamber corresponds to the aforementioned oil chamber of the lockup clutch.

It should further be noted that, although an internal combustion engine is exemplified as example of the prime mover, other prime mover such as an electric motor can be used.

Japanese Patent Application No. 2009-214698 filed on Sep. 16, 2009 is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A hydraulic apparatus for an automatic transmission mounted on a vehicle and equipped with a torque converter having a lockup clutch and a transmission mechanism that inputs an output of a prime mover through the torque converter and transmits power to a wheel of the vehicle, comprising:

a power transmission regulating member that is equipped with a cylinder chamber and regulates the power transmitted by the transmission mechanism in response to hydraulic pressure of operating oil supplied to the cylinder chamber from a hydraulic pressure source;

a first control valve interposed between an oil chamber of the lockup clutch and the hydraulic pressure source to supply/discharge the hydraulic pressure to/from the oil chamber so as to control engagement/disengagement of the lockup clutch and capacity of engagement;

a first electromagnetic solenoid valve that is adapted to control operation of the first control valve;

a second control valve interposed between the hydraulic pressure source and the cylinder chamber of the power transmission regulating member to control operation of the power transmission regulating member by supplying/discharging the hydraulic pressure, to/from the cylinder chamber;

a second electromagnetic solenoid valve that controls operation of the second control valve;

a switching valve interposed between the oil chamber of the lockup clutch and the first control valve; and a controller that stops supply of current to the second electromagnetic solenoid valve so that the second electromagnetic solenoid valve operates the switching valve to disengage the lockup clutch, when detecting that at least one of the first control valve and the first electromagnetic solenoid valve is failed and that the lockup clutch is locked in engaged condition.

2. The hydraulic apparatus according to claim 1, wherein the second electromagnetic solenoid valve is configured to increase hydraulic pressure output to operate the switching valve when the supply of current thereto is stopped.

3. The hydraulic apparatus according to claim 2, wherein the second electromagnetic solenoid valve is configured to increase the hydraulic pressure output as the supply of current decreases, such that the hydraulic pressure output reaches its maximum value when the supply of current is stopped.

4. The hydraulic apparatus according to claim 1, wherein the transmission mechanism comprises a CVT that includes a drive pulley, a driven pulley and a metal belt wound around the pulleys and transmits the output of the prime mover by changing an effective diameter of the drive pulley and the driven pulley.

5. The hydraulic apparatus according to claim 4, wherein the power transmission regulating member comprises the drive pulley and driven pulley of the CVT.

6. The hydraulic apparatus according to claim 5, wherein the second electromagnetic solenoid valve comprises a linear solenoid valve that controls operation of the second control valve which regulates the hydraulic pressure to be supplied to at least one of the cylinder chambers of the drive pulley and driven pulley.

7. The hydraulic apparatus according to claim 1, wherein the power transmission regulating member comprises a forward/reverse switch mechanism having a forward clutch and a reverse clutch used for switching a traveling direction of the vehicle.

8. The hydraulic apparatus according to claim 7, wherein the second electromagnetic solenoid valve comprises a linear solenoid valve that controls operation of the second control valve which regulates the hydraulic pressure to be supplied to at least one of the cylinder chambers of the forward clutch and reverse clutch.

9. The hydraulic apparatus according to claim 1, wherein the prime mover comprises an internal combustion engine.

* * * * *